United States Patent [19]

Jaquith

[11] 3,853,007
[45] Dec. 10, 1974

[54] VOLUMETRIC MEASURING SYSTEM
[75] Inventor: Howard Randall Jaquith, Rushville, N.Y.
[73] Assignee: Sybron Corporation, Rochester, N.Y.
[22] Filed: Feb. 9, 1973
[21] Appl. No.: 331,270

[52] U.S. Cl.................... 73/395, 73/392, 73/420
[51] Int. Cl. ............................................. G01l 7/00
[58] Field of Search ............ 73/392, 395, 420, 418, 73/432 A; 285/138, 334.4, 354

[56] References Cited
UNITED STATES PATENTS
| | | | |
|---|---|---|---|
| 2,679,411 | 5/1954 | Moore | 285/334.4 |
| 2,841,984 | 7/1958 | Green | 73/395 |
| 2,986,938 | 6/1961 | Grandstaff | 73/395 |
| 3,311,131 | 3/1967 | Zahuranec | 73/392 |
| 3,590,641 | 7/1971 | Eggleston | 73/395 |

Primary Examiner—Donald O. Woodiel
Attorney, Agent, or Firm—Theodore B. Roessel; Joseph C. McKenzie

[57] ABSTRACT

A sealed tube system solidly-filled with liquid. One end of the system is elastically deformable by pressure, which deformation is transmitted by the liquid to the other end, which elastically deforms likewise. A thimble and socket connection provides for disconnecting and reconnecting the two ends of the system. The connection is such that if it is used to disconnect and reconnect the ends, then, after reconnection, a given deformation of the one end will cause the same deformation of the other end as it did before disconnection.

10 Claims, 2 Drawing Figures

PATENTED DEC 10 1974  3,853,007

VOLUMETRIC MEASURING SYSTEM

RELATED APPLICATION

Identically entitled copending application for U.S. Letters Patent of Howard R. Jaquith and James A. Symonds, Ser. No. 331,269 and filed concurrently herewith.

BACKGROUND OF THE INVENTION

This invention relates to volumetric measuring systems. Basically, these are sealed envelopes solidly-filled with substantially incompressible liquid. The envelope is generally rigid, but has one or more elastic parts which will respond to changes in internal pressure of the liquid by deforming in proportion to such changes. If there is but one elastic part, change in internal pressure may be due to thermal expansion of the liquid, in which case the system provides a well-known type of thermometer. If there are two elastic portions, pressure to be measured may be applied to one elastic portion, in which case the system provides a well-known pressure gauge, because the other portion deforms correspondingly to provide a signal which quantitatively represents the pressure to be measured.

These systems are often called volumetric systems, since they use a fixed mass of liquid in a volume which is supposed either to remain fixed, or, if variable, to exhibit a fixed defined range of variation. The art pertaining to these systems has developed a high degree of reliability and accuracy for the uses to which these systems are put.

A basic problem, which the prior art does not appear to have solved, is that if the envelope is ruptured, unsealed, or the equivalent, it is normally not possible to repair or restore the system without rebuilding it entirely. This prevents systems from being repaired in the field, and ordinarily the user cannot repair the system at all, but must return it to its maker for repair. Consequently, damage to a part of a system requires replacing the whole system. In prior art pressure measuring systems, the usual damage is to a pressure sensing diaphragm portion which by itself might be easily and inexpensively replaced. Unfortunately, either the damage ruptures the diaphragm, or replacing it would unseal the system, so the whole system has to be replaced by one in working order.

One object of the present invention is to provide a volumetric system which can be sealed and then unsealed by the user, in the field. Consequently, the user of pressure measuring systems need stock only such system spare parts as are likely to be damaged, rather than whole replacement systems.

Another object of the invention is to provide a volumetric system having a sensing portion and a signal portion connected by a capillary tube wherein the said portions can be disconnected from each other and reconnected again, without such disconnection and reconnection quantitatively affecting the operation of the system. A further object of the invention is to provide a system of this sort with a thimble and socket connection constructed so as to provide for such connection and reconnection without quantitatively affecting the operation of the system.

SUMMARY OF THE INVENTION

In the present invention the capillary tube of a volumetric system has a thimble and socket connection between the sensing and signal portions of the system. In particular, the thimble is secured to the signal portion, and the socket terminates one end of the capillary tube, the other end of the capillary tube being terminated by the sensing portion. The socket is clamped to the thimble with such force as to strain the material of the thimble and socket to create an area of mutual contact around registering openings in the thimble and socket. If the thimble is removed from the socket, little or no liquid escapes from the system. If the thimble is to be restored to a socket, then a little liquid can be introduced into the socket beforehand, so that if the thimble is then clamped to the socket, any excess liquid will be squeezed radially outward of the openings, i.e. none of the additional liquid gets into the system unless some had been lost when the thimble was removed from the socket, in which case only enough of the additional liquid remains in the system as will make up the deficit. In practice, the usual reason for disconnecting the thimble from the socket is to replace a damaged or defective sensing portion, the replacement being in the form of a unitary subassembly consisting of sensing portion, capillary tube and socket, so that what the thimble is "restored" to is a new socket, not the one from which it had been disconnected.

BRIEF DESCRIPTION OF THE DRAWING

FIG. 1 is a plan view, partly in section, of a volumetric pressure measuring system, which is the preferred embodiment of the invention;

FIG. 2 is a cross-section, enlarged, of a detail of FIG. 1.

DESCRIPTION OF THE PREFERRED EMBODIMENT OF THE INVENTION

Figures 1, 2:
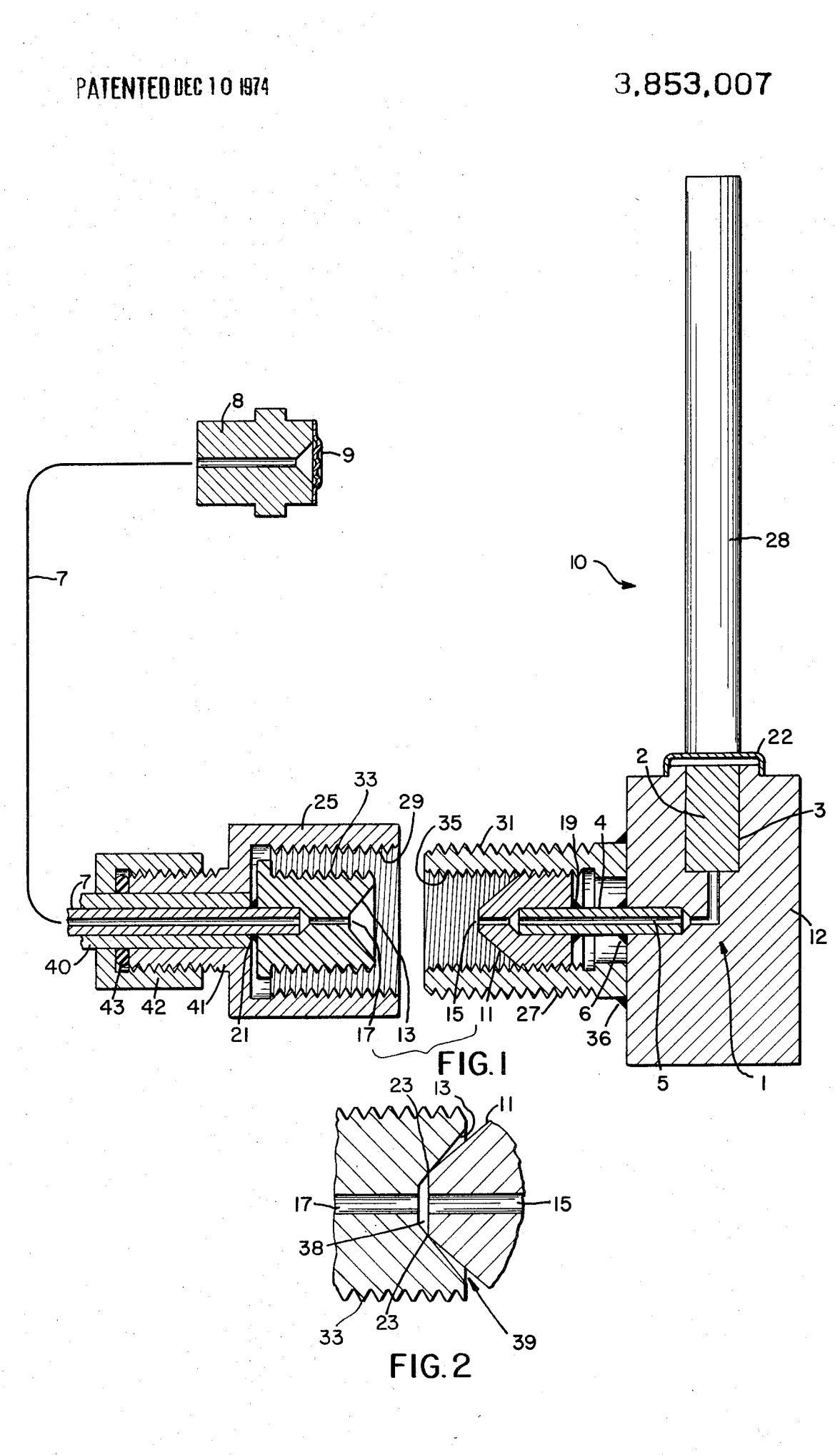

In FIG. 1, reference numeral 10 denotes a pressure transmitter forming one end of a volumetric pressure measuring system. Transmitter 10 constitutes the signal portion of the invention since angular position of, or torque exerted by, its beam 28 may be taken as a signal representative of the magnitude of the difference between fluid pressure acting on the upper side of its sealing diaphragm 22 and the fluid pressure acting on the lower side of diaphragm 22. Transmitter 10 is substantially identically the transmitter disclosed and claimed in my U.S. Pat. No. 3,600,952, so I will further describe its function structure herein only to the extent such function and structure relates to the volumetric system according to the invention, and/or is modified in consequence thereof.

Body member or base 12 is a relatively massive block of stainless steel, or the like, having a right angle bore 1 therein providing a continuous passage therethrough from the left side of base 12 to the upper side thereof. A plug 2 substantially fills the vertical leg of the bore, but nevertheless provides a substantially annular bore 3 opening under the lower surface of the diaphragm. The horizontal leg of the bore 1 is substantially filled by a short section 4 of capillary tubing, so that the lower portion of bore 1 is mainly the bore 5 of the tubing. The intermediate portion of bore 1, which joins bores 3 and 5, is of reduced dimensions with respect to the other portions thereof.

Section 4 is welded peripherally, as indicated at 6, to the surface of base 12 about the opening of bore 1 therein. Diaphragm 22 hermetically seals the upper end of bore 1. Consequently, as disclosed in my aforesaid patent, if fluid under pressure, differing in magnitude from that of the pressure acting on the outside of diaphragm 22, is admitted to the underside of diaphragm 22 via bore 1, then beam 28 will deflect in an amount proportioned to the difference in the magnitude of the two pressures, and in a sense corresponding to the sense of said difference. Such deflection, then, is a signal that may be taken as representing the magnitude of internal pressure of the liquid in the bores 1, 3 and 5.

In order to reduce temperature sensitivity, among other reasons, the bore structure just described is, as usual, intended to minimize the volume of fluid that can be contained within base 12, between the left-hand end of section 4 and the underside of diaphragm 22. In addition, if desired, the plug 2 may be constructed of a material having a lesser temperature coefficient of thermal expansion than the material of base 12. Hence, if the fluid pressure is that of a solid fill of, say, mercury, then, as temperature increases, the volume of bore 3 will increase at a greater temperature rate than elsewhere in the system and thus compensate for the mercury's volumetric increase with increasing temperature.

The rest of the structure, of which the volumetric system essentially consists, is capillary tubing 7, plug 8, and diaphragm 9. These are only sketchily shown, as tubing 7 is simply and in effect an extension of section 4, but much longer, and plug 8 and diaphragm 9 are a counterpart of base 12, diaphragm 22, and the bores of base 12. Thus, plug 8 has an internal bore, one end of which is hermetically closed by diaphragm 9, and the other end of which has an end of tubing 7 hermetically secured therein. Like the base 12 and diaphragm 22, the internal liquid-filled volume in the plug and under the diaphragm 9 is minimized. The difference is that plug 8 and diaphragm 9 provide the sensing portion of the system, as it is intended that diaphragm 9 be exposed to the pressure to be measured, as by using plug 8 as a fitting piercing the wall of a vessel containing fluid under pressure, with diaphragm 9 exposed to such fluid. While tubing 7 is shown with a plain bore, it may be of the kind having a wire, or like filler, in the bore and coextensive therewith, for reducing bore volume to a minimum. Like plug 2, such wire may also be made of material the volumetric temperature expansion of which compensates for the effect on net bore volume, due to volumetric temperature expansion of the tubing and liquid therein.

It is evident that the aforesaid signal and sensing portions, and the capillary tubing 7 which interconnects them, define a sealed envelope. In use, the internal volume of bores, etc., of this envelope is solidly filled with liquid which preferably at all times in the usual conditions of use has an internal pressure stressing the material of the envelope. Further, the envelope, except for diaphragms 9 and 22, is constructed to be essentially rigid. It will therefore be seen that ordinarily the position of, or the torque exerted by beam 28 will indicate the difference between the pressure on the exterior of the diaphragm 22 and the pressure on the exterior of diaphragm 9, and in fact the mercury in the envelope is in effect a rigid link between the diaphragms.

Volumetric systems of this sort must be calibrated before torque or angular position of bar 28 can be said to represent a particular minimal value of pressure. For instance, it may be decided that a certain torque or position should obtain when both diaphragms are exposed to the same value of external fluid pressure, with a certain value of internal pressure in the liquid fill. Such torque or position could be established by exactly solidly-filling the system at a given temperature while both diaphragms are exposed to atmospheric pressure and with the fill itself at atmospheric pressure, and then over-filling in a predetermined amount, and sealing the system. In practice, the system is overfilled just enough that the internal pressure in the liquid is somewhat larger than atmospheric, a typical value being 25PSIG. The system is then calibrated by applying superatmospheric fluid pressure, at various known values, much greater than 25 PSIG, to the exterior of diaphragm 9, and correlating each of these values with the torque exerted, or the position taken, by bar 28.

If the calibrated system is then damaged, it must be repaired and recalibrated, or replaced outright, if the damage causes it to be no longer hermetically-sealed. Prior art systems, thus damaged, must be replaced, because the usual sort of user does not have the capacity for repairing the system. The reason for this is that prior art systems are constructed with an eye to making it impossible to unseal or disassemble without damaging the structure of the system, and/or deleteriously affecting the solidness of its liquid fill.

The system according to the invention is designed so that the user can repair it simply by replacing the sensing portion and capillary tubing 7, or the signal portion, depending on which is damaged, without requiring anything more of the user than that he have a slight quantity of liquid available as well as a replacement for the damaged portion.

According to the invention, a separable connection is provided between the sensing and signal portions of the system, which connection may be interrupted to allow replacement of the damaged portion of the system. Thus, tubing 7 and section 4 are separably joined by a thimble 11 and a socket 13. The thimble and socket are of conventional convex and concave form (for instance, conical, as shown), except that the contours of these forms are deliberately mismatched by making the slope of the convexity of thimble 11 steeper than the concavity of socket 13. Also, the top of the thimble is flattened, that is to say, in effect, the slope of the convexity is less steep at the inner end of the thimble than the outer end of the thimble. The idea is to provide for the thimble surface contacting the socket surface only in a limited annular region at the apices of thimble and socket.

Thimble and socket have bores 15 and 17, enlarged at one end to receive respective ends of section 4 and tubing 7, which are sealed to the thimble and socket by suitable welds 19 and 21, like weld 6 seals section 4 in base 12. It is intended that the thimble and socket mate together as shown in FIG. 2, namely, they interengage under sufficient force that the periphery of the flattened tip of thimble 11 bites into the corresponding surface, and in any event, as indicated at 23, straining the material in contact to such extent that an hermetic metal to metal seal is established throughout an annular area about the opposing registering openings of bores 15 and 17.

While any suitable means may be provided for clamping the thimble and socket together, preferably the interengaging force is exerted as disclosed in the aforesaid Jaquith et al application. Thus, right cylindrical sleeve 27 receives thimble 11 and a protective cover or ring 25. As indicated at 29 and 31, respectively, ring 25 is internally threaded, and sleeve 27 is externally threaded for receiving the ring. While the ring could be threaded along the sleeve, to the right driving the socket 13 before it, in order to exert the clamping force, preferably there is provided, as indicated at 33 and 35, respectively, external threads on socket 13 and internal threads on sleeve 27, so that after section 4 has been welded to base 12 and thimble 11 has been welded to section 4, the sleeve 27 can be threaded on the thimble for clamping the thimble and socket together. As indicated at 36, the sleeve 27 is welded flush to the base 12 so that it forms a rigid integral part thereof in effect.

The sleeve 27 is assembled to the base before the socket 13 is assembled to the thimble 11. The socket is then inserted in the left-hand end of the sleeve, and threaded into and along the sleeve in order to drive the socket on to the thimble. After thimble and socket are in contact, sufficient torque is applied to create the interengagement condition shown in FIG. 2.

As will be observed in FIG. 2, after the thimble and socket have been clamped together a small, somewhat conical space 38 remains between the opposing openings of bores 15 and 17. Supposing that prior to interengaging thimble and socket, the two parts of the system were filled as solidly as possible with mercury, there would be convex mercury menisci projecting from the bore openings of the thimble and socket. By a suitable choice of bore diameters, socket materials and clamping torque, it can result that the total amount of projecting mercury is just enough to solidly-fill the space 38. However, it is preferable that there be somewhat more projecting material, enough more that the excess at least fills the space between thimble and socket, when the latter just contact each other without deformation of the material thereof, whereby to exclude sealing any air whatever into the system. In practice, considerable excess of mercury may be used, because the excess will automatically be separated from the system mercury when the peripheral edge of the flattened end of thimble 11 seats on the corresponding peripheral surface of socket 13.

Replacement units for the sensing portions of course include the tubing 7 and the socket 13, as well as a fill of mercury. The sockets of the replacement units will be provided with suitable caps to keep the mercury in place while the unit is being transported or stored. The amount of mercury in a replacement unit will be just enough that if its diaphragm 9 is maintained at a predetermined distance below the position of the socket, the mercury meniscus will project just the right amount from the opening of bore 17. The difference in level is calculated to produce a head of mercury equivalent to a pressure of 25 PSIG on the interior surface of the diaphragm 9. This provides the original internal pressure of the system.

With socket and diaphragm 9 remaining in the just described positions, the signal portion's thimble is inserted in the socket. If desired, a drop of mercury may be then put in the socket to assure total expulsion of air from space 38 when the thimble and socket are reconnected. The socket is then screwed into sleeve 27, and the thimble and socket clamped together, sufficient torque being exerted on socket 13 to reproduce the condition shown in FIG. 2.

Various modifications may be made in the invention. For instance, the liquid fill could be silicone liquid. While silicones do not resemble mercury much, e.g., they form concave menisci, and can absorb air, or other gases, in practice it is found that repair by replacement works as well with silicone-filled systems, as with mercury-filled systems.

Another modification would be to reverse the relative positions of thimble and socket. However, where, as is usually the case, the signal portion of the system is much more expensive than the sensing, and is seldom damaged such as to unseal the system, it is preferable for it to have the thimble, because the wear and tear on a socket due to the clamping condition shown in FIG. 2 is much worse than on a thimble, so the former will become too worn to make a good seal to a thimble, long before a thimble will become too worn to make a good seal to an unworn socket.

Having described my invention in accordance with the statute, I claim:

1. In a volumetric measuring system having a sealed envelope solidly-filled with substantially incompressible liquid,
   wherein said envelope includes a sensing portion responsive to a condition for causing the internal pressure of said liquid to correspond to said condition,
   wherein said envelope includes a signal portion responsive to said internal pressure for producing a signal corresponding to said internal pressure, and wherein said envelope includes a capillary portion for transmitting internal pressure changes between said sensing and signal portions;
   the improvement wherein said capillary portion has a thimble and a socket each forming a part of said capillary portion, and said socket and said thimble being forcibly interengaged for urging said thimble and socket into contact with each with such force as to strain the material thereof continuously throughout a given area of mutual contact, said thimble and socket each having a capillary passage having openings within said area and registering with one another for defining the thimble and socket parts of said capillary portion.

2. The invention of claim 1, wherein means including a rigid member forcibly interengages said thimble and said socket.

3. The invention of claim 1, wherein said liquid is mercury.

4. The invention of claim 1, wherein said liquid is silicone.

5. The invention of claim 1, wherein said socket and said thimble have, respectively, a concave surface and a convex surface including the said given area of mutual contact, said concave surface having a lesser slope generally than said convex surface at said given area of mutual contact.

6. The invention of claim 5, wherein said convex and concave surfaces are cones, and the cone apex of the convex surface is truncated at said given area to provide a peripheral portion of said convex surface biting into the adjacent portion of said concave surface, due to the force of interengagement of said thimble and socket.

7. A volumetric measuring system consisting essentially of an envelope solidly-filled with substantially incompressible liquid, said envelope having, as part thereof, a thimble and socket, said thimble having a convex surface and a first bore, said socket having a concave surface corresponding to said convex surface and a second bore, each said bore having an opening through the corresponding surface and being surrounded thereby;

said thimble and socket mating with one another with the said bore openings registering with each other, and with the circumadjacent portions of said surfaces contacting each other; and there being clamping means forcibly holding said thimble and socket in mutual contact at said portions;

said concave surface having a lesser slope generally than said convex surface so that the extent of contact of said circumadjacent portions is proportional to the force with which said clamping means holds said thimble and socket together, and said force being sufficient to strain the material of said thimble and socket at said circumadjacent portions.

8. The volumetric measuring system of claim 7, wherein said concave and convex surfaces are cones, and the cone apex of the convex surface is truncated to provide a peripheral portion of said convex surface biting into the adjacent surface portion of said concave surface, due to the said force.

9. The volumetric measuring system of claim 7, wherein said liquid is mercury.

10. The volumetric measuring system of claim 7, wherein said liquid is silicone.

* * * * *